(12) United States Patent
Czeiger et al.

(10) Patent No.: US 7,155,494 B2
(45) Date of Patent: Dec. 26, 2006

(54) MAPPING BETWEEN VIRTUAL LOCAL AREA NETWORKS AND FIBRE CHANNEL ZONES

(75) Inventors: Moshe Czeiger, Haifa (IL); Yoav Flint, Haifa (IL); Ilya Alexandrovich, Haifa (IL); Victor Gissin, Alon Hagalil (IL); Mark Liebman, Afula (IL)

(73) Assignee: Sancastle Technologies Ltd., Yokne'am (IL)

( * ) Notice: Subject to any disclaimer, the term of this patent is extended or adjusted under 35 U.S.C. 154(b) by 599 days.

(21) Appl. No.: 10/040,643

(22) Filed: Jan. 9, 2002

(65) Prior Publication Data

US 2003/0131105 A1 Jul. 10, 2003

(51) Int. Cl.
*G06F 15/16* (2006.01)
(52) U.S. Cl. .............. 709/218; 709/201; 709/217; 711/114; 370/217; 370/389
(58) Field of Classification Search ............ 709/221, 709/201, 218, 217; 370/217, 389; 711/114
See application file for complete search history.

(56) References Cited

U.S. PATENT DOCUMENTS

| | | | |
|---|---|---|---|
| 6,032,209 A | | 2/2000 | Mros et al. |
| 6,223,218 B1* | | 4/2001 | Iijima et al. ............... 709/221 |
| 6,400,730 B1 | | 6/2002 | Latif et al. |
| 6,741,592 B1* | | 5/2004 | Edsall et al. ............... 370/389 |
| 6,751,191 B1* | | 6/2004 | Davar et al. ............... 370/217 |
| 6,779,016 B1* | | 8/2004 | Aziz et al. ............... 709/201 |
| 6,834,326 B1* | | 12/2004 | Wang et al. ............... 711/114 |
| 2002/0147843 A1 | | 10/2002 | Rao |
| 2002/0156924 A1 | | 10/2002 | Czeiger et al. |

OTHER PUBLICATIONS

IEEE 802.3(z) Ethernet Protocol, Issued by the Institute of Electrical and Electronics Engineers, Inc., New Jersey, 2000.
System Specifications, PowerVault 630F, Dell Computer Corporation of Round Rock, Texas, 2001.
Sherri Azgomi, "Using Content-Addressable Memory for Networking Applications," http://www.csdmag.com/main/1999/11/9911feat3.htm, 2001.
System Specifications, PowerVault 650F, Dell Computer Corporation of Round Rock, Texas, 2001.
M. Rajagopal, et al., "Fibre Channel Over TCP/IP (FCIP)," IPS Working Group, Internet Draft <draft-ietf-ips-fcovertcpip-01.txt>, 'Online' Nov. 2000, pp. 1-24.

* cited by examiner

*Primary Examiner*—William Vaughn
*Assistant Examiner*—Thanh T Nguyen
(74) *Attorney, Agent, or Firm*—Birch, Stewart, Kolasch & Birch, LLP

(57) ABSTRACT

A method for transferring information between a first network comprising first-network-stations operating under an Ethernet protocol and a second network comprising second-network-stations operating under a Fibre Channel (FC) protocol, including grouping the first-network-stations into virtual local area networks (VLANs) which each transfer a respective VLAN-data-frame within the VLAN, and grouping the second-network-stations into FC zones which each transfer a respective zone-data-frame within the zone. The method further includes coupling the networks together using a gateway to convey data between the networks, configuring the gateway with an association mapping a primary VLAN and a primary zone, and translating in the gateway between a primary VLAN-data-frame and a primary zone-data-frame, responsive to the association, so as to convey primary-data between the primary VLAN and the primary zone via the gateway.

20 Claims, 4 Drawing Sheets

FIG. 2
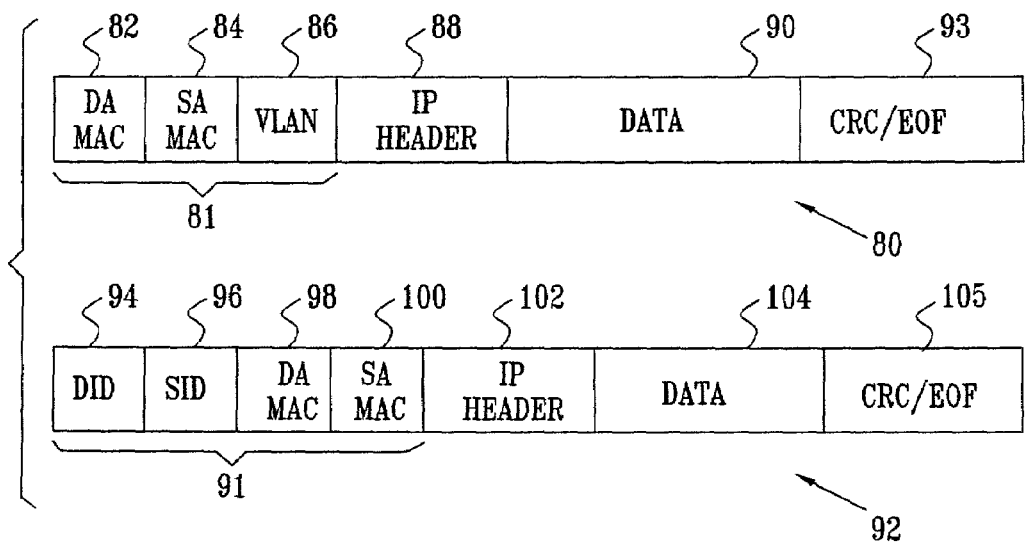
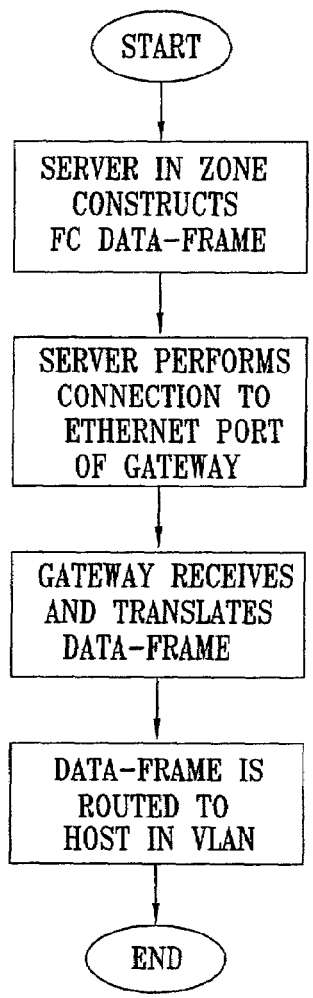
FIG. 3

MAPPING BETWEEN VIRTUAL LOCAL AREA NETWORKS AND FIBRE CHANNEL ZONES

FIELD OF THE INVENTION

The present invention relates generally to data transfer, and specifically to data transfer between regions of networks operating under differing protocols.

BACKGROUND OF THE INVENTION

Methods for transferring data within networks, such as local area networks (LANs), metropolitan area networks (MANs), and storage area networks (SANs), rely on standard protocols describing how the data is transferred. Typically the data for a specific network is transferred as data-frames having a format defined by the protocol governing the functioning of the network. Two protocols which are used for transferring data at gigabit/s (Gbps) rates are an IEEE 802.3(Z) Ethernet protocol, issued by the Institute of Electrical and Electronics Engineers, Inc., New Jersey, and an FC-PH Fibre Channel protocol, issued by the American National Standards Institute, Washington, D.C. The Ethernet protocol transfers data-frames over a common bus by ensuring that no data collision occurs when the frames are on the bus. The Fibre Channel protocol transfers data-frames via a switching fabric controlled by a management facility. The facility sets up a path through the fabric between source and destination ports, and the data-frames are routed along the path, ensuring there are no collisions.

Stations within a LAN or MAN operating according to the IEEE 802.3(Z) Ethernet protocol are often grouped together to form a virtual LAN (VLAN), the VLAN being a sub-set of all stations comprised in the area network. The grouping is a virtual grouping, which may relatively easily be changed, since there is no change in physical connections of the LAN when a VLAN is formed. VLANs are implemented by tagging data-frames transmitted from stations of the VLAN, according to the IEEE 802.1q tagging standard, also issued by the Institute of Electrical and Electronics Engineers, Inc. A station can belong to more than one VLAN. However, stations which do not belong to the same VLAN cannot directly transfer data between themselves.

Zoning is a method used in a Fibre Channel SAN to provide separation between groups of stations of the SAN, similar to the VLANs of the Ethernet network. In contrast to VLANs, where the grouping of the sub-sets is determined by tagging of frames of stations within the sub-sets, the grouping of stations within a zone is implemented by the Fibre Channel management facility. The FC-PH Fibre Channel protocol supports zoning when a station is attached to the Fibre Channel fabric, or when an attached station performs a request. In either event, the station receives a list of all the stations belonging to at least one of the requesting station zones. Another method of Fibre Channel zoning, not supported by the FCPH standard but known in the art, uses a programmed hardware filtering table comprised in a switch of the Fibre Channel fabric. For each frame arriving at a switch port, the switch forwards the frame only if the table indicates that the source FC address in the frame belongs to a zone that belongs to an output port.

Methods for transferring data between networks operating under different protocols operating at Gbps rates are known in the art. Dell Computer Corporation of Round Rock, Tex., provides a PowerVault Fibre Channel family of products which may be configured to transfer data between a Fibre Channel network and a gigabit Ethernet (GBE) network. Data transfer between the networks requires a suitably-adapted server.

In an article by Sherri Azgomi, which can be found at http://www.csdmag.com/main/1999/11/9911feat3.htm, and which is incorporated herein by reference, the author describes content addressable memories (CAMs) and gives a number of uses of CAMs. In contrast to a random access memory (RAM), wherein an address is supplied and data at that address is read, data is supplied to a CAM and the address where that data resides is read. An illustration of the use of a CAM in a network switch is given, wherein the CAM extracts and processes address information in incoming data packets. In order to switch the packet to a correct outgoing port, the CAM compares the destination address with a table of addresses stored within the CAM. On-chip implementations of CAM in the form of embedded functions are available as high-density programmable logic devices (PLDs), for example, as an Altera 10K100E device, produced by Altera Corporation of San Jose, Calif.

U.S. Pat. No. 6,032,209 to Mros et al., whose disclosure is incorporated herein by reference, describes a hot-swappable high speed point-to-point interface. The interface incorporates circuitry to eliminate electromagnetic interference when the interface is hot-swapped. The interface provides a connection between a high speed transmitter on a transmitter card, and a high speed receiver on another card. Both transmitter and receiver are able to operate at rates of the order of Gbps, and under GBE or Fibre Channel protocols.

SUMMARY OF THE INVENTION

It is an object of some aspects of the present invention to provide an improved method and apparatus for transferring data between locally grouped stations of networks operating under different protocols.

In preferred embodiments of the present invention, a gateway couples two area network communication systems, one system operating under a first protocol, most preferably an Ethernet protocol, the other operating under a second protocol, most preferably a Fibre Channel (FC) protocol. Both systems support Internet protocol (IP) frames. The gateway is implemented so that it is transparent to stations using both systems, and is most preferably comprised within a hub of the FC system. Most preferably, both systems comprise networks operating at a rate of at least 1 gigabit/s (Gbps). The Ethernet network has stations within its network formed into one or more subsets termed virtual local area networks (VLANs). The FC network has stations within its network formed into one or more subsets termed zones.

A "combination" grouping is formed by associating a specific VLAN with a specific zone, and data transfers between the VLAN and the zone of the combination grouping via the coupling gateway. The association is stored in the gateway. From the point of view of a VLAN station in the combination, all stations in the combination appear as native VLAN stations. From the point of view of an FC station within the combination, all stations appear as native FC zone stations. The gateway may store a multiplicity of associations, i.e., combination groupings, each combination grouping comprising a one-to-one mapping between a specific VLAN and a specific zone. Stations in the Ethernet network and in the FC network, within a specific combination grouping, may transfer data between themselves via the gateway. Allocating stations in networks operating under Ethernet and FC protocols to be part of one or more combination groupings increases flexibility of station grouping and simplifies security deployment in the infrastructure of the networks.

When an FC device in the FC zone of a specific combination grouping sends an IP FC frame to an Ethernet device in the VLAN of the grouping, the frame is sent to a gateway port, corresponding to a "next hop" destination media access control (MAC) address, which may typically correspond to a default router. The destination identity address is set according to the combination grouping. At the gateway, the frame is translated to an IP Ethernet frame with a VLAN identity corresponding to the source identity address of the FC device. The translated frame is then transmitted from the gateway to the destination Ethernet device.

In the reverse direction, i.e., sending from the VLAN to the FC zone, the gateway uses a source identity address (SID) as a means to explicitly carry the identity of the VLAN in the FC frame. A destination device can make security decisions based on this information. A domain part of the SID receives a "virtual" switch identity which tells the destination device that the SID area is actually the frame's VLAN. An IP frame from a VLAN source is directed by a router in the area network to the gateway port. The frame contains the VLAN identity and an identity for a destination device in the FC zone. On arrival at the gateway, the gateway, acting as the virtual switch, decides how to process the frame according to the VLAN identity and the destination identity. If the zone corresponding to the VLAN is allowed at the destination device, the incoming Ethernet frame is translated to an FC frame and is forwarded to the destination device. (Prior to transfer of a first frame of a specific VLAN to a specific destination device, a connection must be established between the port in the virtual switch that represents the VLAN and the destination device port.)

Each gateway is implemented using industry-standard devices and/or one or more custom or semi-custom devices such as application specific integrated circuits (ASICs), most preferably as a component which couples to an industry-standard hub operative in one of the systems.

In some preferred embodiments of the present invention, a content addressable memory (CAM) comprised in the gateway is used in order to quickly translate addresses. Most preferably, the CAM "learns" the addresses of stations after installation of the gateway, by analyzing data transferred as it is received. The CAM uses the learned addresses to build a look-up table for converting addresses between the two systems.

There is therefore provided, according to a preferred embodiment of the present invention, a method for transferring information between a first network including first-network-stations operating under an Ethernet protocol and a second network including second-network-stations operating under a Fibre Channel (FC) protocol, including:

grouping the first-network-stations into one or more virtual local area networks (VLANs), each of the VLANs including one or more of the first-network-stations which transfer a respective VLAN-data-frame within the VLAN;

grouping the second-network-stations into one or more FC zones, each of the zones including one or more of the second-network-stations which transfer a respective zone-data-frame within the zone;

coupling the first and the second networks together using a gateway to convey data between the networks;

configuring the gateway with a primary association mapping a primary VLAN chosen from the VLANs and a primary zone chosen from the zones, the primary VLAN transferring a primary VLAN-data-frame including primary-data, included in the data, therein, and the primary zone transferring a primary zone-data-frame including the primary-data therein; and translating in the gateway between the primary VLAN-data-frame and the primary zone-data-frame, responsive to the primary association, so as to convey the primary-data between the primary VLAN and the primary zone via the gateway.

Preferably, configuring the gateway with the primary association includes storing the primary association in a memory included in the gateway, the memory including a content addressable memory which uses the primary association to perform the translation.

Preferably, translating in the gateway between the primary VLAN-data-frame and the primary zone-data-frame includes transferring the primary-data transparently between the primary VLAN and the primary zone so that the primary VLAN and the primary zone are not aware of translations performed in the gateway.

Preferably, the method further includes:

configuring the gateway with a secondary association mapping a secondary VLAN chosen from the VLANs and a secondary zone chosen from the zones, the secondary VLAN transferring a secondary VLAN-data-frame including secondary-data, included in the data, therein, and the secondary zone transferring a secondary zone-data-frame including the secondary-data therein; and translating in the gateway between the secondary VLAN-data-frame and the secondary zone-data-frame, responsive to the secondary association, so as to convey the secondary-data between the secondary VLAN and the secondary zone via the gateway.

Further preferably, the method includes restricting the secondary VLAN and the secondary zone from accessing the primary-data.

Preferably, the method further includes:

providing a joint second-network-station, chosen from the second-network-stations, implemented to be in the primary zone and the secondary zone;

conveying the primary-data between the joint second-network-station and the primary VLAN, responsive to the primary association; and conveying the secondary-data between the joint second-network-station and the secondary VLAN, responsive to the secondary association.

Preferably, the method further includes:

providing a joint first-network-station, chosen from the first-network-stations, implemented to be in the primary VLAN and the secondary VLAN;

conveying the primary-data between the joint first-network-station and the primary zone, responsive to the primary association; and conveying the secondary-data between the joint first-network-station and the secondary zone, responsive to the secondary association.

Preferably, configuring the gateway includes allocating a virtual port of the gateway to the primary association, and translating in the gateway includes operating the gateway as a virtual switch so as to check a connection between the virtual port and a destination first-network-station included in the primary VLAN.

Further preferably, translating in the gateway includes translating an identity of the primary VLAN in the primary VLAN-data-frame to a virtual source identity in the primary zone-data-frame, for data conveyed from the first network to the second network.

Preferably, translating in the gateway includes translating a virtual destination identity included in the primary zone-data-frame to an identity of the primary VLAN in the primary VLAN-data-frame, for data conveyed from the second network to the first network.

There is further provided, according to a preferred embodiment of the present invention, apparatus for transferring information between a first network operating under an Ethernet protocol and including first-network-stations grouped into one or more VLANs, each VLAN including one or more of the first-network-stations which transfer a respective VLAN-data-frame within the VLAN, and a second network operating under a Fibre Channel (FC) protocol and including one or more second-network-stations grouped into one or more zones, each zone including one or more of the second-network-stations which transfer a respective zone-data-frame within the zone, the apparatus including:

a gateway which is adapted to couple the first and the second network and to map a primary association between a primary VLAN chosen from the VLANs and a primary zone chosen from the zones, the primary VLAN transferring a primary VLAN-data-frame including primary-data therein, and the primary zone transferring a primary zone-data-frame including the primary-data therein, and to translate between the primary VLAN-data-frame and the primary zone-data-frame, responsive to the primary association, so as to convey the primary-data between the primary VLAN and the primary zone.

Preferably, the gateway includes a content addressable memory wherein the primary association is stored and which is adapted to perform the translation.

Preferably, translating in the gateway between the primary VLAN-data-frame and the primary zone-data-frame includes transferring the primary-data transparently between the primary VLAN and the primary zone so that the primary VLAN and the primary zone are not aware of translations performed in the gateway.

Preferably, the gateway is adapted to map a secondary association between a secondary VLAN chosen from the VLANs and a secondary zone chosen from the zones, the secondary VLAN transferring a secondary VLAN-data-frame including secondary-data therein, and the secondary zone transferring a secondary zone-data-frame including the secondary-data therein, and to translate between the secondary VLAN-data-frame and the secondary zone-data-frame, responsive to the secondary association, so as to convey the secondary-data between the secondary VLAN and the secondary zone.

Further preferably, the gateway is adapted to restrict the secondary VLAN and the secondary zone from accessing the primary-data.

Preferably, the apparatus includes a joint second-network-station, chosen from the second-network-stations, implemented to be in the primary zone and the secondary zone, so that the primary-data is conveyed between the joint second-network-station and the primary VLAN responsive to the primary association, and the secondary-data is conveyed between the joint second-network-station and the secondary VLAN responsive to the secondary association.

Preferably, the apparatus includes a joint first-network-station, chosen from the first-network-stations, implemented to be in the primary VLAN and the secondary VLAN, so that the primary-data is conveyed between the joint first-network-station and the primary zone responsive to the primary association, and the secondary-data is conveyed between the joint first-network-station and the secondary zone responsive to the secondary association.

Preferably, the gateway includes a virtual port allocated to the primary association, and the gateway is adapted to operate as a virtual switch so as to check a connection between the virtual port and a destination first-network-station comprised in the primary VLAN.

Further preferably, the gateway is adapted to translate an identity of the primary VLAN in the primary VLAN-data-frame to a virtual source identity in the primary zone-data-frame, for data conveyed from the first network to the second network.

Further preferably, the gateway is adapted to translate a virtual destination identity comprised in the primary zone-data-frame to an identity of the primary VLAN in the primary VLAN-data-frame, for data conveyed from the second network to the first network.

The present invention will be more fully understood from the following detailed description of the preferred embodiments thereof, taken together with the drawings, in which:

BRIEF DESCRIPTION OF THE DRAWINGS

FIG. 2 shows structures of Internet protocol (IP) data-frames transmitted via an Ethernet protocol, and IP data-frames transmitted via a Fibre Channel protocol, according to a preferred embodiment of the present invention;

FIG. 3 is a flowchart showing steps comprised in transferring data from the FC fabric to the WAN of the network of FIG. 1, according to a preferred embodiment of the present invention;

DETAILED DESCRIPTION OF PREFERRED EMBODIMENTS

Figure 1:
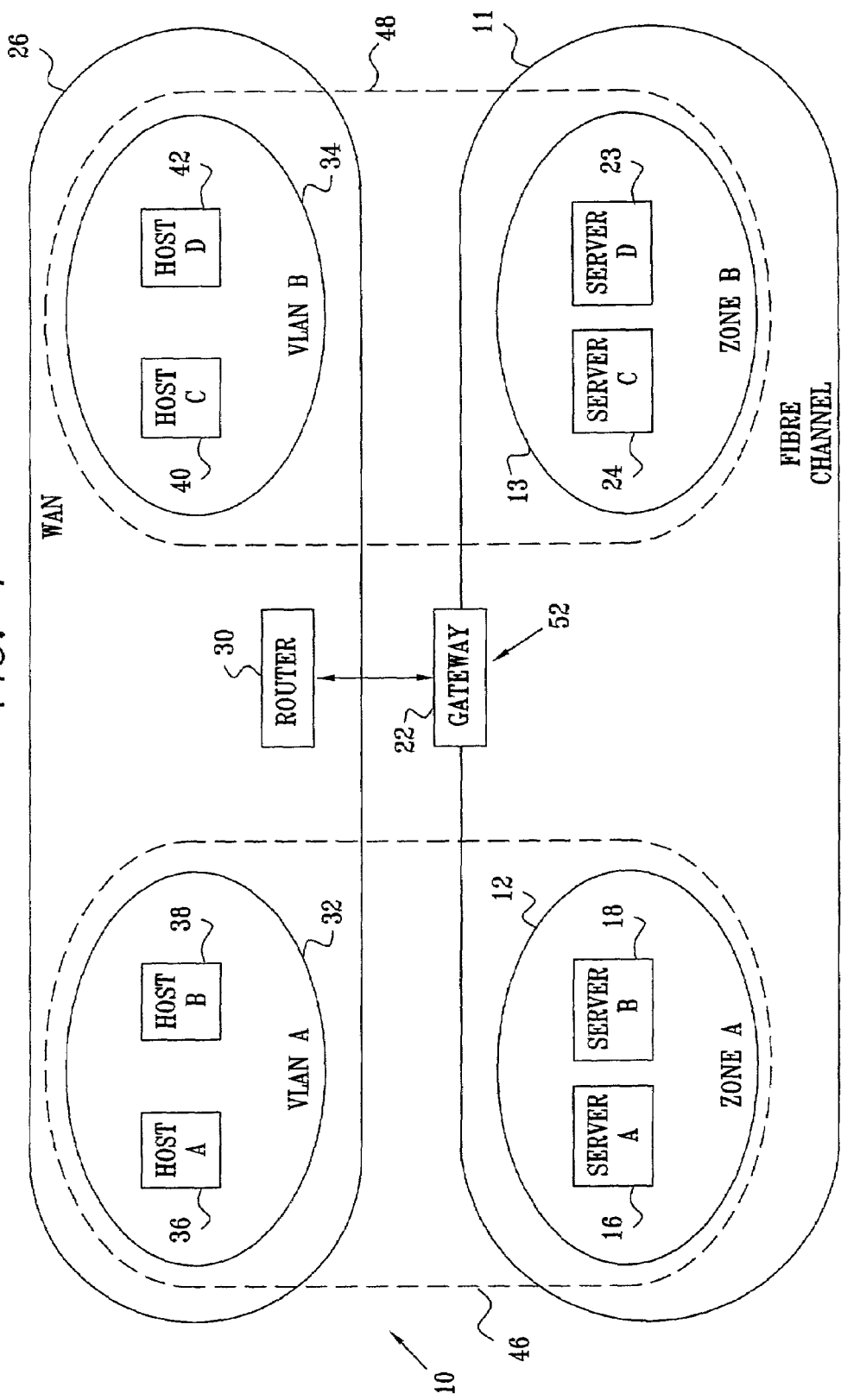
FIG. 1 is a schematic diagram of a compound network coupling a Fibre Channel (FC) fabric and an Ethernet Wide Area Network (WAN), according to a preferred embodiment of the present invention.

Reference is now made to FIG. 1, which is a schematic diagram of a compound network 10 coupling a Fibre Channel (FC) fabric 11 and an Ethernet Wide Area Network (WAN) 26, according to a preferred embodiment of the present invention. FC fabric 11 operates according to the FC-PH Fibre Channel protocol, and WAN 26 operates according to the IEEE 802.3(Z) Ethernet protocol, as described in the Background of the Invention. WAN 26 comprises generally similar Ethernet stations 36, 38, 40, and 42, herein assumed to be hosts, also respectively termed herein hosts A, B, C, and D. Within WAN 26 a first virtual local area network (VLAN) 32 comprises hosts 36 and 38 and a second VLAN 34 comprises hosts 40 and 42. VLANs 32 and 34 comprise subsets of stations within WAN 26, and are also herein referred to respectively as VLAN A and VLAN B. WAN 26 also comprises a router 30, which operates within WAN 26 so as, inter alia, to transfer data-frames generated within the WAN between stations of the WAN. Hosts A, B, C, and D, are each allocated an Internet protocol (IP) address, so that they are able to transfer IP data-frames between themselves, subject to the VLAN limitations stated above. Most preferably, an operator of network 10 allocates the IP addresses. The addresses must be locally unique in order to implement IP communication between hosts A, B, C, and D.

Fabric 11 comprises generally similar FC stations 16, 18, 23, and 24, herein assumed to be servers, also herein termed respectively servers A, B, C, and D. A server 20 is used as a management facility for FC fabric 11. A first FC zone 12 of fabric 11 comprises servers 16 and 18, and a second FC zone 13 of the fabric comprises servers 23 and 24. Zones 12 and 13 comprise FC stations which are subsets of fabric 11, and are also herein termed respectively zones A and B. Fabric 11 comprises a gateway 22, which is most preferably comprised within a hub of the fabric. Gateway 22 is coupled to router 30, so that the gateway is able to receive data-frames from both fabric 11 and WAN 26 according to their respective protocols. Furthermore, gateway 22 is adapted to convert the data-frames between protocol formats, and to transmit in either format, so that the gateway acts as a data-frame transfer and conversion conduit. aServers A, B, C, and D, are each allocated an IP address, so that they are able to transfer IP data-frames between themselves, subject to the zoning limitations stated above. Most preferably, the operator of network 10 allocates the IP addresses via management server 20. The addresses must be locally unique in order to implement IP communication between servers A, B, C, and D.

Most preferably, at the installation of gateway 22, the operator of network 10 makes associations between specific VLANs and specific zones to form combination zones, each combination zone comprising one VLAN and one FC zone. Herein VLAN A and zone A are associated to form combination zone 46, and VLAN B and zone B are associated to form combination zone 48. Combination zones 46 and 48 are also referred to herein as combination zones A and B respectively. Alternatively, the associations are made after gateway 22 has been installed. As described in more detail below, the gateway acts as a coupling for combination zones A and B, forming a (VLAN A, zone A) couple and a (VLAN B, zone B) couple. Once each association has been implemented, Ethernet stations in a specific combination zone see all stations in the combination as native Ethernet stations, and FC stations see all stations in the combination as native FC stations.

When the association is made, a virtual port address is allocated to each couple associated by the gateway. The virtual port addresses are used by FC stations as a source zone identification. Most preferably, the virtual port addresses are chosen from a virtual switch domain, i.e., addresses of a fictitious switch in fabric 11. Alternatively, the virtual port addresses are chosen from addresses in the gateway domain, i.e., addresses allocated to the gateway.

FIG. 2 shows structures of Internet protocol (IP) data-frames transmitted via an Ethernet protocol, and IP data-frames transmitted via a Fibre Channel protocol, according to a preferred embodiment of the present invention. An Ethernet data-frame 80 operating under IP comprises a header section 81 and a data section 90. Header section 81 comprises a frame destination address (DA) 82 and a frame source address (SA) 84, both most preferably being media access control (MAC) identifiers of the respective addresses. Header section 81 also comprises an identifier 86 for a VLAN within which the frame is transferred. Frame 80 comprises an IP header 88 containing an initial source address and a final destination address of the frame. Frame 90 also comprises a data section 90, and a cyclic redundancy code (CRC) error-checking and end-of-frame (EOF) section 93. It will be appreciated that during transfer of frame 80 within an Ethernet network, DA MAC address 82 and SA MAC address 84 may change, depending on the routing of the frame within the VLAN. VLAN identifier 86, IP header 88 and the data section 90 are substantially unchanged as the frame traverses the VLAN.

A Fibre Channel data-frame 92 operating under IP comprises a header section 91 and a data section 104. Header section 91 comprises a destination identification (DID) address 94, a source identification (SID) address 96, a MAC destination address 98, and a MAC source address 100. Frame 92 further comprises an IP header 102, which, as for IP header 88, comprises an initial source address and a final destination address of the frame. Data section 104 is substantially similar in construction to section 90. Frame 92 further comprises a CRC/EOF section 105, generally similar to section 93. In contrast to data-frame 80, as data-frame 92 transfers through an FC zone there is substantially no change in header section 91, since the routing of the frame, is performed by elements of the FC fabric such as switches and hubs.

When a data-frame is converted by gateway 22 from an Ethernet data-frame to a Fibre Channel data-frame, or vice versa, data in respective sections 88, 90 and 102, 104 are substantially identical. For conversion from an Ethernet data-frame to a Fibre Channel data-frame, section 81 is converted to header section 91. For conversion from a Fibre Channel data-frame to an Ethernet data-frame, header section 91 is converted to header section 81.

FIG. 3 is a flowchart showing steps comprised in transferring data from fabric 11 to WAN 26, for stations which are comprised in combination zone A, according to a preferred embodiment of the present invention. Server A in zone A is assumed to send data to host A in VLAN A.

In a first step, server A constructs FC data-frame 92, and incorporates in header 102 the IP address of server A as the source IP address, and the IP address of host A as the destination IP address. DID address 94 and DA MAC address 98 are determined using an Address Resolution Protocol (ARP). DID address 94 is set to be the virtual port of gateway 22 associated with couple (VLAN A, zone A), and DA MAC address 98 is set to be the MAC address of router 30. SID address 96 is the address of server A, which was determined at a fabric connection phase. SA MAC address 100 is set to be the physical address of server A.

In a second step, server A performs a connection with the virtual port of the gateway, i.e., with the port corresponding to DID address 94. FC data-frame 92 is then transmitted into fabric 11.

In a third step, gateway 22 receives data-frame 92, and translates the data-frame to Ethernet data-frame 80. At the gateway, DA MAC address 82 and SA MAC address 84 are respectively copied from DA MAC address 98 and SA MAC address 100. DID address 94 is translated to the identifier of VLAN A, and is written into VLAN section 86 of the Ethernet data-frame. IP header address section 88 is written to be substantially the same as IP header address section 102. Ethernet data-frame 80 is then transmitted from gateway 22 into WAN 26.

In a final step, Ethernet data-frame 80 is transferred via router 30 to host A, which is able to receive the data-frame since host A is in VLAN A. During the transfer router 30 changes the DA MAC and SA MAC addresses, written into sections 82 and 84, to correspond respectively to the physical address of host A and the physical address of the router.

In the transfer process described with reference to FIG. 4, the IP header in sections 102 and 88 and the data in sections 104 and 90 are maintained substantially unchanged.

Figure 4:
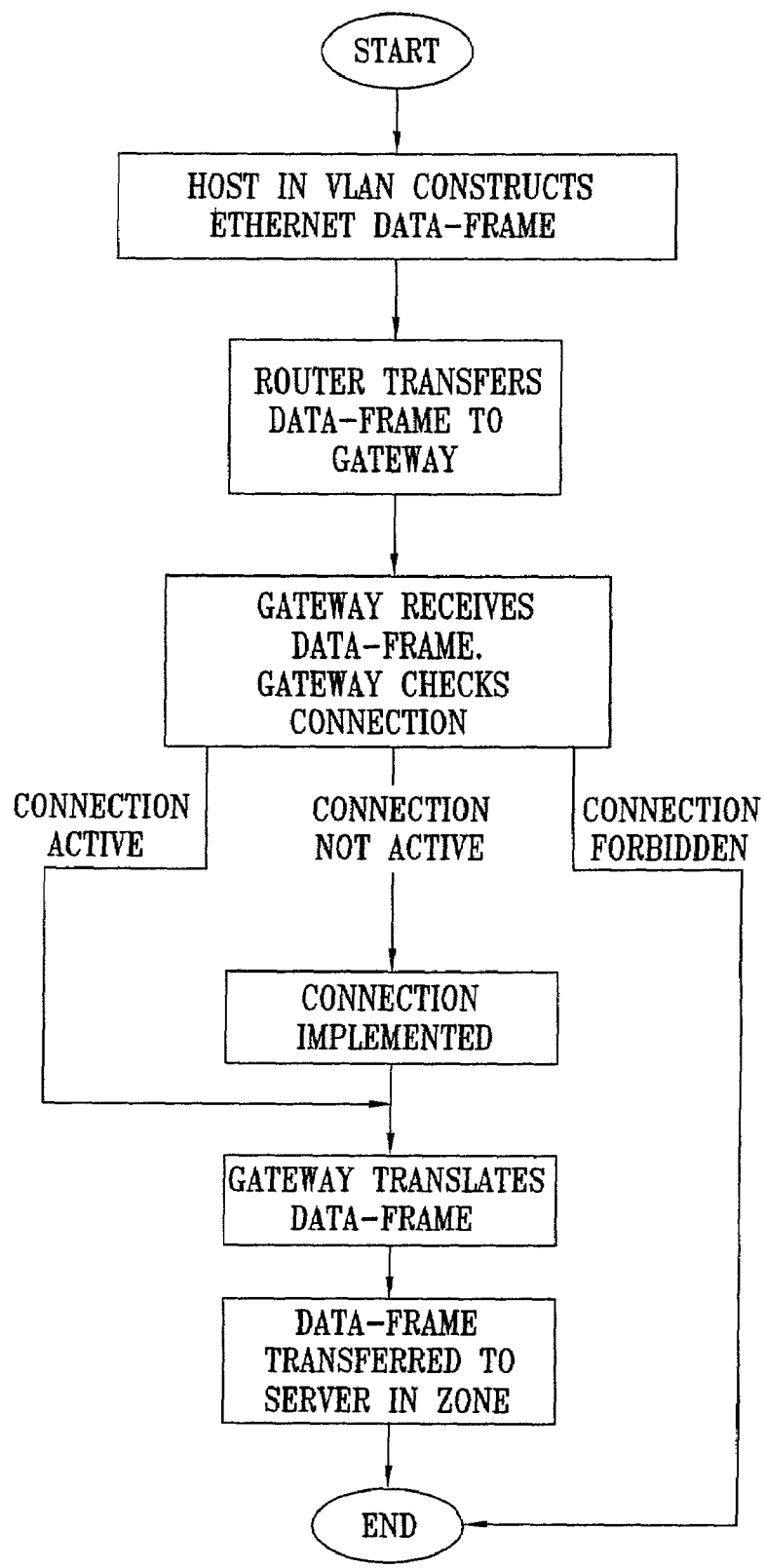
FIG. 4 is a flowchart showing steps comprised in transferring data from the WAN to the FC fabric of the network of FIG. 1, according to a preferred embodiment of the present invention.

FIG. 4 is a flowchart showing steps comprised in transferring data from WAN 26 to fabric 11, for stations which are comprised in combination zone A, according to a preferred embodiment of the present invention. Host A in VLAN A is assumed to send data to server A in zone A.

In a first step, host A constructs Ethernet data-frame 80, and incorporates in header 88 the IP address of host A as the source IP address, and the IP address of server A as the destination IP address. DA MAC address 82 is set to be the physical address of router 30, and SA MAC address 84 is set to be the physical address of host A. The identifier of VLAN A is written into VLAN section 86 of the data-frame. Data-frame 80 is then transmitted into WAN 26.

In a second step, router 30 transfers data-frame 80 to gateway 22, changing DA MAC section 82 to be the physical address of server A, and SA MAC section 84 to be the physical address of the router. The remainder of data-frame 80 is substantially unchanged.

In a third step, gateway 22 receives Ethernet data-frame 80, and uses the VLAN identifier in section 86 and the destination IP address comprised in header 88 to check the connection between the VLAN and the destination IP. The gateway assumes the role of a virtual switch to make the check about the connection between the virtual port of the gateway associated with the (VLAN A, zone A) couple and server A, identified from the destination IP address. There are three possible outcomes of the check:

The connection is active. In this case the process continues at a fifth step below.

The connection is forbidden. A forbidden connection might occur, for example, if server A is not in zone A. In this case data-frame 80 is dropped.

The connection is not active. In this case the process continues in a fourth step, wherein a CPU in the gateway implements the connection, and then delivers the delayed frame.

In the fifth step, FC data-frame 92 is generated from Ethernet data-frame 80. DID address 94 is most preferably generated from the destination IP address in header 88 using a CAM in gateway 22 such as CAM 56 (FIG. 1). SID address 96 is set to be the virtual port address associated with the (VLAN A, zone A) couple. DA MAC address 98 and SA MAC address 100 are copied from the Ethernet frame.

In a final step, FC data-frame 92 is conveyed, by the connection set up in the third and/or fourth step, to server A.

Figure 5:
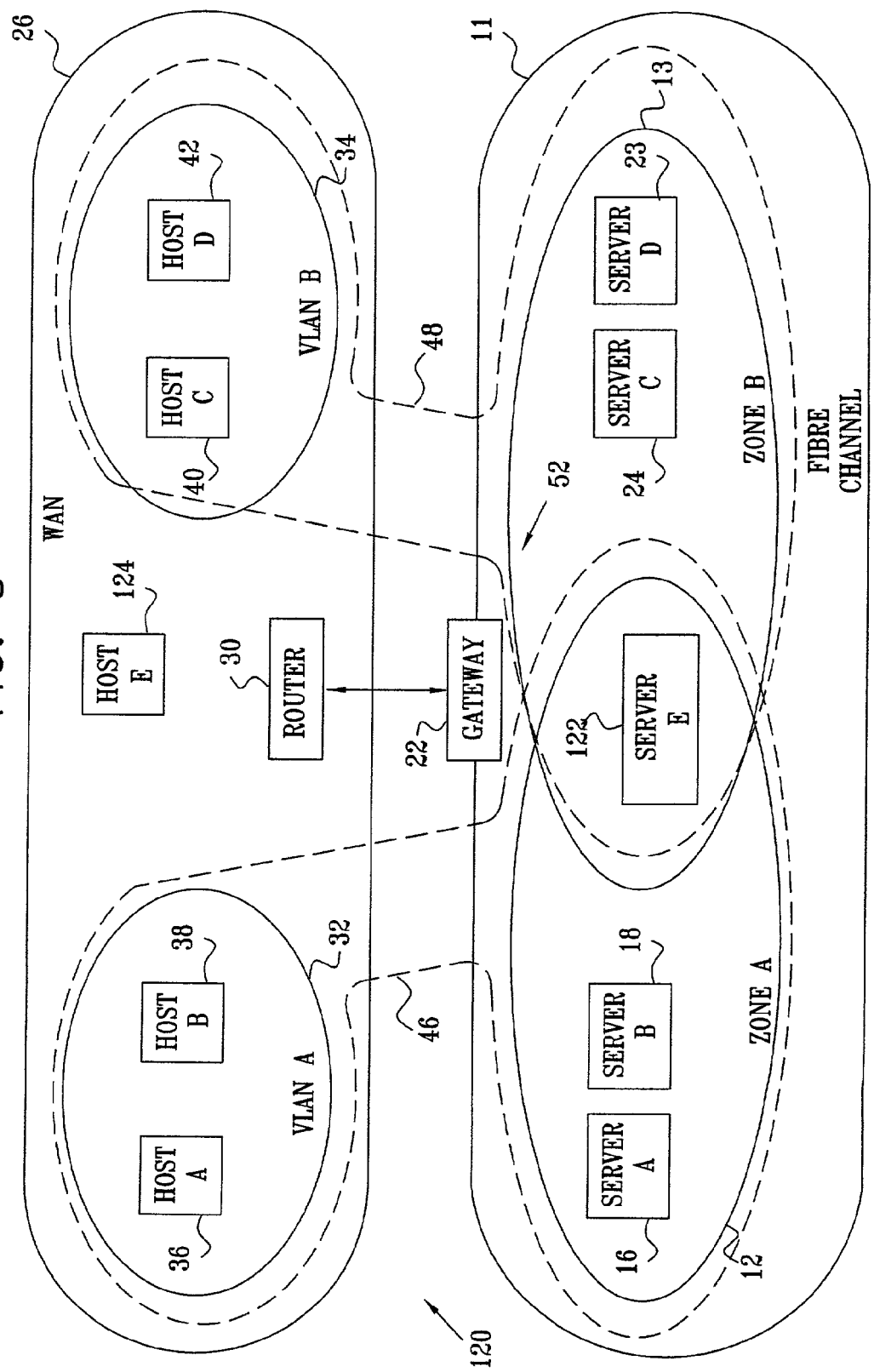
FIG. 5 is a schematic diagram of a compound network coupling the FC fabric and the Ethernet WAN of FIG. 1, according to an alternative preferred embodiment of the present invention.

FIG. 5 is a schematic diagram of a compound network 100 coupling Fibre Channel (FC) fabric 11 and Ethernet Wide Area Network (WAN) 26, according to an alternative preferred embodiment of the present invention. Apart from the differences described below, the operation of network 120 is generally similar to that of network 10 (FIG. 1), so that elements indicated by the same reference numerals in both networks 120 and 10 are generally identical in construction and in operation. Compound network 120 comprises, in fabric 11, a server 122, also referred to herein as server E. Server E is implemented to be in both zone A and zone B, so acting as a "joint" server. Thus, server E is able to communicate within zone A with servers A and B, and within zone B with servers C and D.

Since server E is in zone A, it is also in combination zone A, and is thus able to communicate with VLAN A and hosts A and B. Thus, server E is able to send data to host A substantially as described above (FIG. 3) for server A sending data to host A, using the virtual port of gateway 22 associated with couple (VLAN A, zone A) as DID address 94. Host A is able to send data to server E substantially as described above (FIG. 4) for host A sending data to server A. As described therein, gateway 22 uses the VLAN A identifier in section 86 and the destination IP address of server E, comprised in header 88, to check the connection between VLAN A and server E.

Since server E is also in zone B, it is also in combination zone B, and is thus able to communicate with VLAN B and hosts C and D. Thus, server E can send data to host C using the virtual port of gateway 22 associated with couple (VLAN B, zone B) as DID address 94. Host C is also able to send data to server E substantially as described above, gateway 22 using the VLAN B identifier in section 86 and the destination IP address of server E, comprised in header 88, to check the connection between VLAN B and server E.

It will be appreciated that a host 124 in WAN 26, also referred to herein as host E, and which is implemented to be in both VLAN A and VLAN B, is able to communicate within combination zone A with servers in zone A, and within combination zone B with servers in zone B.

Data transfer implemented by preferred embodiments of the present invention is transparent, in both directions of transfer, to sources and destinations of the data. In other words, a station originating data in a VLAN in WAN 26 is not aware of any of the translation processes performed in gateway 22 and involved in transferring the data, via the gateway, to a zone in FC fabric 11. Similarly, a station transferring data from a zone in fabric 11 to a VLAN in WAN 26 is not aware of gateway 22, or of translations performed in the gateway.

It will be understood that the scope of the present invention is not limited to the number of VLANs, FC zones, and combination zones described above with respect to FIG. 1. IEEE 802.3(Z) Ethernet protocol supports up to 4096 VLANs, so that preferred embodiments of the present invention operating under the above-referenced protocol can comprise up to 4096 combination zones, each combination zone comprising an association between one VLAN and one FC zone.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for transferring information, comprising:

operating a first network comprising first-network-stations under an Ethernet protocol;

operating a second network comprising second-network-stations under a Fibre Channel (FC) protocol;

grouping the first-network-stations into one or more virtual local area networks (VLANs), each of the VLANs comprising one or more of the first-network-stations which transfer a respective VLAN-data-frame within the VLAN;

grouping the second-network-stations into one or more FC zones, each of the zones comprising one or more of the second-network-stations which transfer a respective zone-data-frame within the zone;

coupling the first and the second networks together using a gateway to convey data between the networks;

configuring the gateway with a primary association mapping a primary VLAN chosen from the VLANs and a primary zone chosen from the zones, the primary VLAN transferring a primary VLAN-data-frame comprising primary-data, comprised in the data, therein, and the primary zone transferring a primary zone-data-frame comprising the primary-data therein; and translating in the gateway between the primary VLAN-data-frame and the primary zone-data-frame, responsive to the primary association, so as to convey the primary-data between the primary VLAN and the primary zone via the gateway.

2. A method according to claim 1, wherein configuring the gateway with the primary association comprises storing the primary association in a memory comprised in the gateway, the memory comprising a content addressable memory which uses the primary association to perform the translation.

3. A method according to claim 1, wherein translating in the gateway between the primary VLAN-data-frame and the primary zone-data-frame comprises transferring the primary-data transparently between the primary VLAN and the primary zone so that the primary VLAN and the primary zone are not aware of translations performed in the gateway.

4. A method according to claim 1, and comprising:
configuring the gateway with a secondary association mapping a secondary VLAN chosen from the VLANs and a secondary zone chosen from the zones, the secondary VLAN transferring a secondary VLAN-data-frame comprising secondary-data, comprised in the data, therein, and the secondary zone transferring a secondary zone-data-frame comprising the secondary-data therein; and
translating in the gateway between the secondary VLAN-data-frame and the secondary zone-data-frame, responsive to the secondary association, so as to convey the secondary-data between the secondary VLAN and the secondary zone via the gateway.

5. A method according to claim 4, and comprising restricting the secondary VLAN and the secondary zone from accessing the primary-data.

6. A method according to claim 4, and comprising:
providing a joint second-network-station, chosen from the second-network-stations, implemented to be in the primary zone and the secondary zone;
conveying the primary-data between the joint second-network-station and the primary VLAN, responsive to the primary association; and
conveying the secondary-data between the joint second-network-station and the secondary VLAN, responsive to the secondary association.

7. A method according to claim 4, and comprising:
providing a joint first-network-station, chosen from the first-network-stations, implemented to be in the primary VLAN and the secondary VLAN;
conveying the primary-data between the joint first-network-station and the primary zone, responsive to the primary association; and
conveying the secondary-data between the joint first-network-station and the secondary zone, responsive to the secondary association.

8. A method according to claim 1, wherein configuring the gateway comprises allocating a virtual port of the gateway to the primary association, and wherein translating in the gateway comprises operating the gateway as a virtual switch so as to check a connection between the virtual port and a destination first-network-station comprised in the primary VLAN.

9. A method according to claim 1, wherein translating in the gateway comprises translating an identity of the primary VLAN in the primary VLAN-data-frame to a virtual source identity in the primary zone-data-frame, for data conveyed from the first network to the second network.

10. A method according to claim 1, wherein translating in the gateway comprises translating a virtual destination identity comprised in the primary zone-data-frame to an identity of the primary VLAN in the primary VLAN-data-frame, for data conveyed from the second network to the first network.

11. Apparatus for transferring information comprising:
a gateway which is adapted to couple a first network operating under an Ethernet protocol and comprising first-network-stations grouped into one or more VLANs, each VLAN comprising one or more of the first-network-stations which transfer a respective VLAN-data-frame within the VLAN, and a second network operating under a Fibre Channel (FC) protocol and comprising one or more second-network-stations grouped into one or more zones, each zone comprising one or more of the second-network-stations which transfer a respective zone-data-frame within the zone, the gateway also being adapted to map a primary association between a primary VLAN chosen from the VLANs and a primary zone chosen from the zones, the primary VLAN transferring a primary VLAN-data-frame comprising primary-data therein, and the primary zone transferring a primary zone-data-frame comprising the primary-data therein, and to translate between the primary VLAN-data-frame and the primary zone-data-frame, responsive to the primary association, so as to convey the primary-data between the primary VLAN and the primary zone.

12. Apparatus according to claim 11, wherein the gateway comprises a content addressable memory wherein the primary association is stored and which is adapted to perform the translation.

13. Apparatus according to claim 11, wherein translating in the gateway between the primary VLAN-data-frame and the primary zone-data-frame comprises transferring the primary-data transparently between the primary VLAN and the primary zone so that the primary VLAN and the primary zone are not aware of translations performed in the gateway.

14. Apparatus according to claim 11, wherein the gateway is adapted to map a secondary association between a secondary VLAN chosen from the VLANs and a secondary zone chosen from the zones, the secondary VLAN transferring a secondary VLAN-data-frame comprising secondary-data therein, and the secondary zone transferring a secondary zone-data-frame comprising the secondary-data therein, and to translate between the secondary VLAN-data-frame and the secondary zone-data-frame, responsive to the secondary association, so as to convey the secondary-data between the secondary VLAN and the secondary zone.

15. Apparatus according to claim 14, wherein the gateway is adapted to restrict the secondary VLAN and the secondary zone from accessing the primary-data.

16. Apparatus according to claim 14, and comprising a joint second-network-station, chosen from the second-network-stations, implemented to be in the primary zone and the secondary zone, so that the primary-data is conveyed between the joint second-network-station and the primary VLAN responsive to the primary association, and the secondary-data is conveyed between the joint second-network-station and the secondary VLAN responsive to the secondary association.

17. Apparatus according to claim 14, and comprising a joint first-network-station, chosen from the first-network-stations, implemented to be in the primary VLAN and the secondary VLAN, so that the primary-data is conveyed between the joint first-network-station and the primary zone responsive to the primary association, and the secondary-data is conveyed between the joint first-network-station and the secondary zone responsive to the secondary association.

18. Apparatus according to claim 11, wherein the gateway comprises a virtual port allocated to the primary association, and wherein the gateway is adapted to operate as a virtual switch so as to check a connection between the virtual port and a destination first-network-station comprised in the primary VLAN.

19. Apparatus according to claim 11, wherein the gateway is adapted to translate an identity of the primary VLAN in the primary VLAN-data-frame to a virtual source identity in the primary zone-data-frame, for data conveyed from the first network to the second network.

20. Apparatus according to claim 11, wherein the gateway is adapted to translate a virtual destination identity comprised in the primary zone-data-frame to an identity of the primary VLAN in the primary VLAN-data-frame, for data conveyed from the second network to the first network.

* * * * *